Jan. 30, 1962  R. L. HENRY  3,019,343
UNIVERSAL LINE TRACER
Filed March 13, 1959  2 Sheets-Sheet 1

WHITE ON BLACK

BLACK ON WHITE

INVENTOR.
ROBERT L. HENRY.
BY
ATTORNEYS.

Jan. 30, 1962  R. L. HENRY  3,019,343
UNIVERSAL LINE TRACER
Filed March 13, 1959  2 Sheets-Sheet 2

INVENTOR.
ROBERT L. HENRY.
BY
*Howard Keiser*
*John F. Verhoeven*
ATTORNEYS.

United States Patent Office 3,019,343
Patented Jan. 30, 1962

3,019,343
UNIVERSAL LINE TRACER
Robert L. Henry, Cincinnati, Ohio, assignor to The Cincinnati Milling Machine Co., Cincinnati, Ohio, a corporation of Ohio
Filed Mar. 13, 1959, Ser. No. 799,207
6 Claims. (Cl. 250—202)

This invention relates to a machine adapted to reproduce a shape represented by a pattern line and, more particularly, to a line tracing mechanism which will follow automatically either a light line drawn on a dark background, or a dark line drawn on a light background.

In my prior Patent No. 2,868,993, granted January 13, 1959, for Apparatus for Reproducing a Pattern Outline, there is disclosed a machine which is adapted to follow a light line drawn on a dark background and to reproduce the shape of the line on a metal workpiece. This system has produced very satisfactory results and the dark background of the pattern aids in reducing the problem of spurious responses from the photomultiplier tube due to the reflection of random light rays from the pattern. However, it is sometimes necessary or desirable to track a dark line on a light background despite the extra precautions required to prevent random light rays falling on the pattern from interfering with the tracing operation. The pulse produced by the photomultiplier tube when tracing a dark line on a light background will, of course, be of opposite polarity from the pulse produced by a light line on a dark background. Therefore, to render the tracing apparatus truly universal it is necessary to convert one of the pulses to a pulse of the opposite polarity so that pulses of the same sign will be provided irrespective of the type of line being traced by the apparatus.

Accordingly, it is an object of the present invention to provide a tracing apparatus which will follow either a light light on a dark background or a dark line on a light background.

Another object of the invention is to provide a universal tracing apparatus which will automatically condition itself to trace either a light line or a dark line without any intervention on the part of the operator.

Another object of the invention is to provide a tracing apparatus which will always provide a signal of the same character regardless of whether the line being traced is lighter or darker than the background of the material.

With these and other objects in view, which will become apparent from the following description, the invention includes certain novel features of construction and combinations of parts, the essential elements of which are set forth in the appended claims, and a preferred form or embodiment of which will hereinafter be described with reference to the drawings which accompany and form a part of this specification.

Figure 3A:
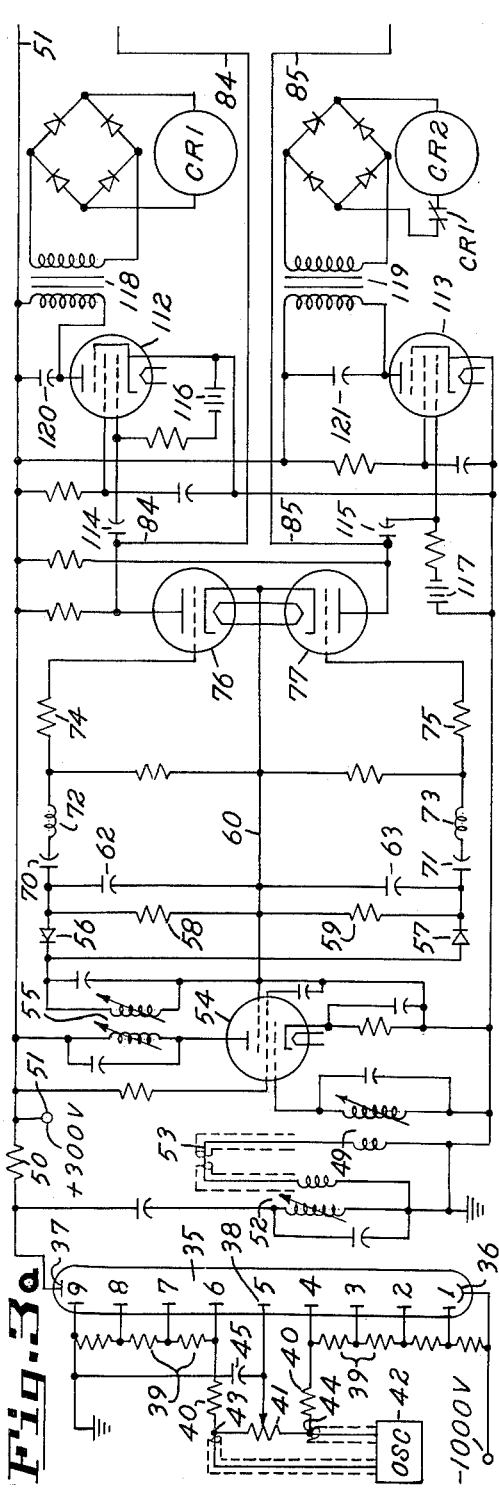
Figure 3B:
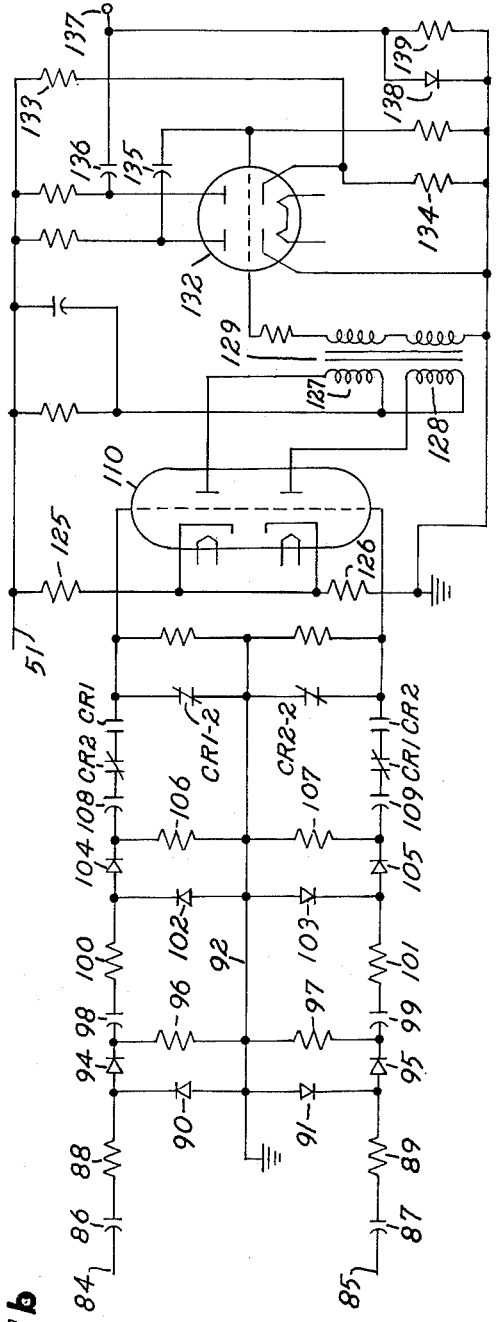

FIGS. 3a and 3b taken together constitute a wiring diagram of the universal tracing apparatus.

Similar reference characters designate similar or identical elements and portions throughout the specification and throughout the different views of the drawings.

*General description*

Figure 1:
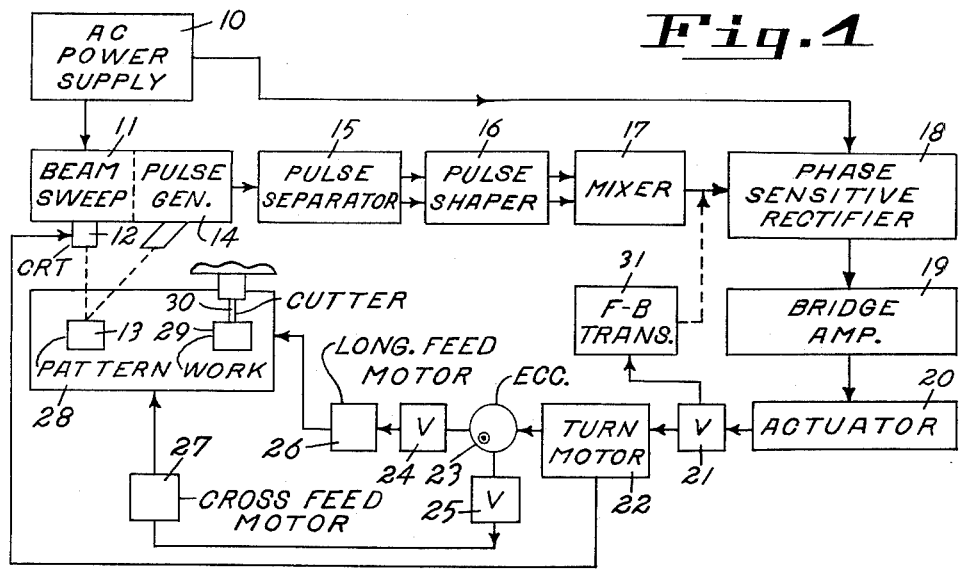
FIG. 1 is a block diagram showing one type of tracing system to which the present invention may be applied.

As mentioned earlier, the present invention relates to a line tracing machine for the type disclosed in my issued Patent No. 2,868,993. The block diagram of the tracing system shown in FIG. 1 of the drawings depicts the same system which was shown and described in the patent and reference may be made to that patent for a detailed description of the complete tracing system. In this system, an A.C. power supply 10 (FIG. 1) delivers current at a suitable frequency, for example 400 cycles per second, to a sweep circuit 11 for a cathode ray tube 12. As the electron beam of the cathode ray tube is swept back and forth it produces a trace on the face of the tube which is then projected onto the pattern 13. A pulse generator 14 which may comprise a photomultiplier tube is arranged to receive light reflected from the pattern as the moving light spot, produced by the cathode ray tube, sweeps back and forth across the pattern line. The phase relationship of the pulses produced by the photomultiplier tube with respect to the cyclical sweep of the light beam provides an indication of the direction and extent of deviation of the center of the beam sweep from the pattern line. This phase relationship is utilized to produce a signal voltage having a sign and magnitude corresponding to the direction and extent of deviation of the center of the beam sweep from the line which is used to control the direction of travel of the cathode ray tube relative to the pattern so as to return the center of the beam sweep onto the line. For this purpose, the pulses produced on the forward sweep of the beam are separated from those produced on the return sweep by a pulse separator circuit 15 after which the two trains of pulses are fed into a pulse shaper circuit 16 where they are formed into sign waves which are then mixed in a mixer circuit 17 to produce a composite sign wave. The output of the mixer circuit is fed into phase sensitive rectifier 18 which provides a D.C. signal of appropriate sign and magnitude to indicate the direction and extent of deviation of the center of the beam sweep from the pattern line. The rectified signal is then amplified in a bridge type D.C. amplifier 19 after which it is utilized to energize an actuator 20 which operates a valve 21 which controls the direction and rate of rotation of a hydraulic turn motor 22. This motor rotates both the deflection coils of the cathode ray tube 12 and also an eccentric 23 which operates sine-cosine valves 24 and 25 which control the operation of a longitudinal feed motor 26 and a cross-feed motor 27, respectively. As indicated in the diagram, these motors provide two directions of movement to a table 28 on which the pattern 13 and a piec of work 29 to be machined are mounted. A cutting tool 30 is adapted to engage the work 29 and to machine it to an outline conforming to the outline provided on the pattern 13. A minor feedback loop is provided by a feedback transformer 31 which is controlled by the position of valve 21 and feeds a bucking signal voltage to the input of phase sensitive rectifier 18 to stabilize the position of the valve 21.

The apparatus disclosed in Patent No. 2,868,993 was designed to trace a white line drawn on a black background which resulted in a negative pulse being produced by the photomultiplier tube each time the light beam crossed the pattern line. The control circuits of the machine were designed to accept this negative pulse and to amplify it and thereafter process the pulse through the various circuits to produce the desired control voltage. However, when a pattern having a black line on a light background is to be traced, the pulse produced by the photomultiplier tube is a positive one so that provision must be made for reversing its polarity before the circuits disclosed in the patent can utilize the pulse to provide the desired control of the machine. Other problems are involved in tracing a black line on a white background such as swamping of the photomultiplier tube by the increased amount of light received by it from the pattern; the occurrence of a considerable amount of "noise" along with the signal pulse due to spots or dirt on the pattern, and the interference caused by random light rays falling on the pattern which tend to mask out the desired pulses produced by the pattern line.

Accordingly, the present invention is concerned with a new and unique type of pulse-forming circuit which will overcome the difficulties enumerated above and which will produce a pulse of the polarity required by the line tracing circuit regardless of the type of pattern employed.

In the new circuit hereinafter to be disclosed, the photomultiplier tube circuit is modified to produce modulation of a high frequency carrier wave with the pulses produced by the tube. Thereby, the tendency of the tube to be swamped by the large amount of light reflected by a pattern having a light background is reduced and the tube is rendered more sensitive to the black line being traced on the pattern. Also, it is possible to so demodulate the carrier wave as to always obtain a pulse of the same polarity regardless of the nature of the line being traced. This is accomplished by demodulating both halves of the carrier separately so as to obtain both a positive going pulse and a negative going pulse regardless of the type of line being traced. One type of pulse is then selected by a limiter circuit for delivery to the utilization circuits which may be of the same nature as those disclosed in the patent.

Photomultiplier tube

In FIG. 3a is shown a photomultiplier tube 35 which may be of any one of the conventional types well known to those working in the art. The tube 35 includes a light sensitive cathode 36, an anode 37 and nine dynodes 38 which augment the flow of electrons from the cathode 36 to the anode 37 by a process of secondary emission. As indicated in FIG. 3a, the cathode 36 is connected to the negative terminal of a 1000 volt D.C. power supply while dynode 9 is connected to the positive terminal thereof which is also connected to ground. Hence, a 1000 volt potential difference exists between the cathode 36 and the ninth dynode and this potential gradient is distributed between the dynodes by means of voltage dropping resistor 39 which are of equal value so as to produce equal voltage drops between the dynodes 1 to 4 and 6 to 9. The number 4, 5, and 6 dynodes are supplied with D.C. voltage by a voltage divider circuit comprised of a pair of resistors 40 of equal value and a potentiometer 41 the slider of which is connected to number 5 dynode. The values of the resistors 40 and potentiometer 41 are so chosen that the voltage drop between the number 4 and 5 dynodes and between the number 5 and number 6 dynodes is equal to one half the voltage drop between the remaining dynodes. The potentiometer 41 enables the potential of the number 5 dynode to be placed mid-way between the potentials of the number 4 and number 6 dynodes.

A carrier frequency is supplied to the tube 35 by means of an oscillator 42 of conventional design which delivers a low radio frequency voltage, such as 455 kc., through shielded leads to terminals 43 and 44 which form junction points between the resistors 40 and the potentiometer 41. The R.F. carrier voltage from the oscillator 42 is thereby placed across the resistance of potentiometer 41, the slider of which is connected to ground through a capacitor 45. The size of this capacitor is sufficiently large to establish the number 5 dynode at A.C. ground. The peak-to-peak voltage provided by oscillator 42 is equal to the D.C. potential between the number 4 and number 6 dynodes and the A.C. drive on dynodes 4 and 6 with reference to ground is equal to one half the peak-to-peak voltage provided by the oscillator. Since the A.C. voltage is superimposed on the D.C. voltage on the number 4 and number 6 dynodes, on each cycle of the R.F. carrier the voltage between dynodes 4 and 5 and 5 and 6 will simultaneously vary from zero to the full potential difference which exists between the remaining dynodes of the photomultiplier tube. When the potential between dynodes 4, 5 and 6 is zero, current flow through the tupe 35 will be blocked whereas when the potential between the dynodes is equal to that between the other dynodes the tube will conduct so that on each cycle of the modulating voltage, the photo tube will pass from a non-conducting condition to a normal conducting condition and back to a non-conducting condition so as to modulate the output of the tube at a frequency equal to that supplied by the oscillator 42.

The anode 37 is connected through a resistor 50 to a source of positive potential 51 which may, for example, be 300 volts positive with respect to ground. The load resistor 50 is large enough to limit the conduction of the tube 35 to its rated value when a pattern having a black line on a white background is used. This is necessary in order to prevent damage to the photomultiplier tube resulting from excessive conduction due to the very high cathode illumination resulting from the white background. The high-frequency carrier wave appearing in the output of the tube 35 will, of course, be modulated by the pulses resulting from changes in the amount of light falling on the cathode 36 as the beam of light produced by the cathode ray tube sweeps back and forth across the pattern line.

The output of the tube 35 is capacitance coupled to the primary winding of a transformer 52 which is tuned to the carrier frequency. The secondary winding of the transformer is connected by a shielded lead 53 with the primary winding of a transformer 49. This transformer may be situated at a point remote from the transformer 52 and has a secondary winding which, like the primary winding of the transformer 52, is tuned to the carrier frequency. By employing a large stepdown ratio between the primary and secondary windings of the transformer 52 and a corresponding stepup ratio between the primary and secondary windings of the transformer 49, a low impedance circuit is provided by the shielded lead 53 and the windings connected thereto so as to minimize stray pickup by the lead which may be of considerable length.

The secondary winding of transformer 49 feeds the modulated carrier to the grid of a pentode amplifier tube 54. The tuned primary winding of a transformer 55 is connected in the plate lead of the tube 54 so that the tube operates as a tuned amplifier at the carrier frequency. The secondary winding of the transformer 55 is likewise tuned to the carrier frequency and the output from the secondary is delivered to a novel form of demodulator circuit which will now be described.

Demodulator

The demodulator takes the form of what may be termed a half and half rectifier which demodulates both halves of the carrier wave. As shown in FIG. 3a, the output from the secondary winding of transformer 55 is fed in parallel to two oppositely connected diodes 56 and 57 so that the negative half of the carrier wave will be detected by the diode 56 while the positive half thereof will be detected by the diode 57. The rectified voltages will appear across load resistors 58 and 59 each connected between a ground wire 60 and one terminal of the diodes. By-pass condensers 62 and 63 are connected in parallel with the load resistors so as to short circuit the carrier frequency to ground and cause the signal envelope to be developed across the load resistors.

Figure 2A:
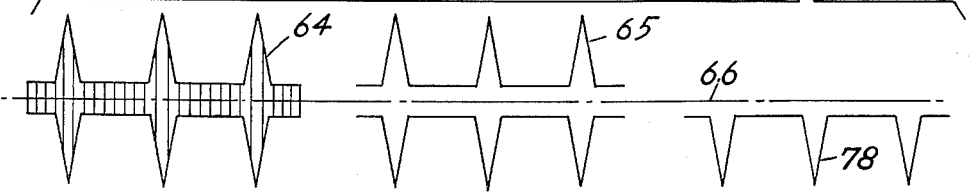
FIGS. 2a and 2b are diagrams of the wave forms produced by the new universal pulse producing circuit.

In FIG. 2a are shown the wave forms which appear when a white line on a black background is being traced. In this figure, reference numeral 64 indicates the modulated carrier which is delivered by the secondary winding of transformer 55 to the demodulator circuit while reference numeral 65 depicts the envelope which appears across resistors 58 and 59 after detection. It is to be realized of course that the negative half of this envelope, i.e., the portion below the center line 66, represents the signal developed across the load resistor 58 while the portion above the line indicates the positive half of the signal which is developed across the load resistor 59.

Figure 2B:
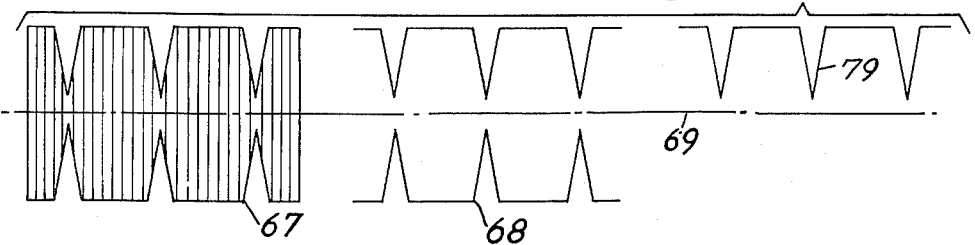

If the pattern being traced is comprised of a black line on a white background, the modulated carrier wave appearing in the secondary winding of transformer 55 will have the form shown in the left hand portion of FIG. 2b which is designated by reference numeral 67. After demodulation and by-passing of the high frequency carrier, the voltage developed across the resistors 58 and 59 will take the form of the envelope 68 shown in the central portion of this figure. Here again, the negative portion of the wave, i.e., the portion beneath the center line 69 will be developed across the resistor 58 while the positive portion, i.e., the portion above the line, will be developed across the resistor 59.

The demodulated signals or pulses are passed through coupling capacitors 70 and 71 (FIG. 3a) to filter chokes 72 and 73 which present a high impedance to the carrier frequency and provide further filtering of the signal. The signals are then passed through grid resistors 74 and 75 to the grids of a pair of triode vacuum tubes 76 and 77. These tubes serve as limiters to discriminate against the positive pulses passing through either side of the demodulator circuit this, of course, depending upon the type of line being traced. As shown, the tubes are operated at zero bias so that any portion of the signal which drives the grid positive will cause grid current to flow which then will be dropped across resistors 74 or 75. Hence, the grids can be driven only slightly positive and any positive pulses appearing at the grids will be effectively blocked.

Inasmuch as the by-pass condensers 70 and 71 break the D.C. level of the signal, the grids of the tubes will recognize the pulses as merely positive going or negative going signals. Hence, when a white line on a black background is being traced, the positive half of the modulated wave passed by diode 57 will be dropped by resistor 75, due to grid current flowing in the tube 77, so that there will be no effective output from this tube. However, the negative half of the modulated wave passed by the diode 56 will appear as negative going pulses on the grid of tube 76 and will cause positive pulses to appear in the plate circuit of this tube. In FIG. 2a reference numeral 78 indicates the negative pulses which will appear at the grid of the tube 76. In the case of a black line on a white background, the positive half of the modulated wave passed by diode 57 will present negative going pulses to the grid of tube 77. These pulses, then, will pass through the tube with consequent amplification to provide positive pulses in the plate circuit thereof. The negative half of the modulated wave passed by the diode 56 will, however, present positive going pulses to the grid of tube 76. These pulses will be dropped across the resistor 74 due to grid current flow in tube 76 so that no output will be derived from this tube. In FIG. 2b reference numeral 79 designates the negative going pulses which will appear on the grid of the tube 77 when a black line on a white background is being traced. Hence, it is seen that in one case a positive pulse will appear in the plate circuit of tube 76 whereas in the other case a positive pulse will appear in the plate circuit of tube 77.

Limiter circuits

The plates of tubes 76 and 77 are connected by conductors 84 and 85, respectively, to a system of series-parallel diode limiters as shown in the left-hand portion of FIG. 3b. Conductors 84 and 85 are connected to the capacitors 86 and 87 which pass the signal pulses but again break the D.C. level of the signal. Any negative going portion of the signal passing through the capacitors 86 or 87 will see a very low impedance circuit in resistors 88 and 89 and diodes 90 and 91. The diodes will pass any negative going signal directly to the ground conductor 92 and the resistors 88 and 89 are of sufficiently low impedance to pass the positive going pulses without attenuation while providing a voltage dropping resistance for any negative going pulses passing through the capacitors 86 and 87. The positive going pulses are then passed through diodes 94 and 95 and develop a positive voltage across the relatively high resistance presented by resistors 96 and 97. Capacitors 98 and 99 again break the D.C. level of the signal which is then fed into another parallel diode limiter circuit similar to the one just described and comprising low value voltage dropping resistors 100 and 101, short circuiting diodes 102 and 103, positive pulse passing diodes 104 and 105, and high valued voltage developing resistors 106 and 107. The signals are then passed through coupling capacitors 108 and 109 and relay contacts CR1 and CR2 to the grids of a dual triode vacuum tube 110. The relay contacts CR1 and CR2 are controlled by a pulse selection circuit which will now be described.

Pulse controlled selection circuit

The pulse selection circuit includes a pair of beam power amplifier tubes 112 and 113 (FIG. 3a), the grids of which are connected through coupling capacitors 114 and 115 with the plates of tubes 76 and 77. The tubes 112 and 113 are biased to cut off or beyond by a suitable source of biasing voltage which is schematically illustrated herein by batteries 116 and 117. The plates of tubes 112 and 113 are fed from the conductor 51 through the primary windings of transformers 118 and 119. Capacitors 120 and 121 connected across the primary windings serve to broaden out the pulses transmitted by the primary to the secondary windings of the transformers. Each secondary winding is connected with a bridge type rectifier which supplies energizing current to the coils of relays CR1 and CR2. Hence, the relay CR1 will be energized by power derived from positive pulses appearing on the grid of tube 112 when a white line on a black background is being traced. Conversely, relay CR2 will be energized by the positive pulses appearing on the grid of tube 113 when a black line on a white background is being traced.

In a tracing system of the present design, it is desirable to provide a normally closed contact of relay CR1 in series with the energizing coil of relay CR2. Also, it is desirable that the bias applied to the grid of tube 112 be considerably higher than the bias applied to the grid of tube 113. With this arrangement, the lower bias on tube 113 will permit relay CR2 to be energized very readily upon the appearance of positive pulses on the grid of tube 113 when a black line is being traced. Under such conditions, the relay CR1 cannot readily be energized by negative noise spikes reaching the grid of tube 76 due to the high bias applied to the tube 112. If a white line is being traced, it is possible that the relay CR2 may be energized due to the relatively lower bias on this tube and the possibility of negative noise spikes reaching the grid of tube 77. However, when a white line is being traced, the posititve pulses applied to the grid of tube 112 will be of sufficient magnitude to ensure energization of the relay CR1 which will then open the contacts CR1 in series with the coil of relay CR2. Thereby, relay CR2 will be deenergized and will remain in this condition as long as relay CR1 is held energized by the positive pulses applied to the grid of tube 112.

Returning again to the wiring diagram shown in FIG. 3b, when relay CR1 is energized, relay CR2 will be deenergized and positive pulses in the conductor 84 will be passed to the upper grid of the tube 110. Any stray noise spikes in the conductor 85 will be prevented from reaching the lower grid of tube 110 due to the opening of the CR1 contacts and the normally open CR2 contacts in series with this grid. Also, the shorting relay contacts CR2-2 will be closed so as to short-circuit any such pulses to the ground conductor 92. Hence, the bottom grid of tube 110 will be maintained at ground potential.

If the machine is tracing a black line on a white background, the relay CR2 will be energized and the relay CR1 will be deenergized. In this case the conductor 85 will be connected to the bottom grid of tube 110 through the closed contacts CR1 and CR2 while the conductor 84 will be disconnected from the upper grid by the opening of contacts CR2 and the normally open relay contacts CR1 shown in FIG. 3b. At the same time, the normally closed contacts CR1-2 will be closed thereby connecting the upper grid of tube 110 to ground potential.

*Translation circuit*

Both halves of the tube 110 are biased beyond cutoff by the positive voltage applied to the cathodes of this tube through a voltage divider comprised of series-connected resistors 125 and 126 which are interposed between the conductor 51 and ground. Hence, only that section of the tube to which positive pulses are applied can conduct. Both plates of the tube are connected to conductor 51 through primary windings 127 and 128 of a transformer 129. The primarys are so connected that current will always flow through them in the same direction regardless of which section of the tube is conducting. The transformer 129 has its secondary winding connected with the grid of a dual triode vacuum tube 132 which operates as a two stage limiter. The left hand section of the tube is operated at zero bias so that only the negative pulses supplied from the secondary winding of transformer 129 can be amplified by the tube and delivered to the grid of the right hand section of the tube. The right hand section is biased beyond cutoff by a voltage divider comprised of resistors 133 and 134 connected between the conductor 51 and ground so as to apply positive voltage to the cathode of this section of the tube. Hence, only the positive going pulses applied to the grid of the tube through the coupling capacitor 135 can cause this section of the tube to conduct and deliver a series of negative pulses through a coupling capacitor 136 to an output terminal 137. Any positive pulses appearing at the output terminal will be shorted to ground through a diode 138 connected in parallel with a resistor 139 of high resistance. The negative pulses appearing at the output terminal 137 may then be utilized to control the tracing operation of the pattern controlled machine in the manner disclosed in my prior Patent No. 2,868,993. In other words, the terminal 137 may be connected by a suitable conductor with the junction point 255 shown in FIG. 20 of the patent which is adapted to receive negative pulses from the photomultiplier tube and to utilize these pulses in the manner disclosed in the patent to automatically control the tracing of the pattern and effect a duplication of the pattern outline in the workpiece.

It will be observed from the foregoing description that I have provided a means for enabling a line tracing system to accept either white line drawings or black line drawings without any necessity for the operator of the machine to make a selection as to which type of pattern line is to be traced by the machine. Also, by modulating a high frequency carrier wave with the pulse output of the photomultiplier it is possible to render the line tracing apparatus adaptable to tracing black lines on a white background or white lines on a black background with equal facility.

While I have described my invention in combination with one possible form or embodiment thereof and have used, therefore, certain specific terms and language herein, it is to be understood that the present disclosure is illustrative rather than restrictive and that changes and modifications may be resorted to without departing from the spirit of the invention as defined by the claims which follow.

I claim:

1. In a line tracing machine adapted to scan a line on a pattern with a moving light beam and produce an electrical signal of the same character each time the beam crosses the pattern line irrespective of whether the line be a light line drawn on a dark background or a dark line drawn on a light background, the combination of means for causing a light beam to be oscillated back and forth across the line on the pattern, a photomultiplier tube arranged to receive light reflected from said pattern by said light beam and to produce an electrical pulse each time the beam crosses the line, means to produce a high-frequency carrier, means for modulating the high-frequency carrier with the pulses produced in the photomultiplier tube, means to separately demodulate each half of the carrier, and means to limit each of the demodulated voltages to produce a signal pulse which is of the same character regardless of whether a light line or a dark line is being traced.

2. The line tracing machine of claim 1 wherein said demodulating means includes a half and half rectifier for detecting both the positive and negative portions of the modulated carrier to derive both positive and negative going pulses corresponding to the pulses produced in the photomultiplier tube.

3. The line tracing machine of claim 2 wherein said limiting means includes means for amplifying the derived pulses of one sense and rejecting the derived pulses of the other sense to thereby produce a signal pulse of the same character when either a light line or a dark line is being traced.

4. In a line tracing machine adapted to scan a line on a pattern with a moving light beam and produce an electrical signal of the same character each time the beam crosses the pattern line irrespective of whether the line be a light line drawn on a dark background or a dark line drawn on a light background, the combination of a photomultiplier tube arranged to receive light reflected from said pattern by said light beam and to produce an electrical pulse each time the beam crosses the line, means to produce a high-frequency carrier, means for modulating the high-frequency carrier with the pulses produced in the photomultiplier tube, a half and half rectifier for detecting both the positive and negative portions of the modulated carrier to derive both positive and negative going pulses corresponding to the pulses produced in the photomultiplier tube, a circuit for amplifying the derived pulses of one sense when a light line is being traced, and another circuit for amplifying the derived pulses of the same sense when a dark line is being traced, whereby a signal pulse of the same character is produced regardless of whether a light line or a dark line is being traced.

5. The line tracing machine of claim 4 including an output terminal, and means for translating the pulses of said one sense from either of said circuits to said output terminal.

6. The line tracing machine of claim 5 including means intermediate said circuits and said pulse translating means for normally disconnecting said circuits from said translating means, and means controlled by the pulses of said one sense for selectively connecting the circuit containing said pulses to said pulse translating means.

References Cited in the file of this patent

UNITED STATES PATENTS 2,730,567     McConnell _____ Jan. 10, 1956